United States Patent [19]

Schwarte et al.

[11] Patent Number: 5,747,166
[45] Date of Patent: May 5, 1998

[54] AQUEOUS COATINGS AND PROCESSES FOR THE PRODUCTION OF AUTOMOBILE FINISHES

[75] Inventors: Stephan Schwarte, Emsdetten; Horst Grosch, Leinach, both of Germany

[73] Assignee: BASF Corporation, Southfield, Mich.

[21] Appl. No.: 645,696

[22] Filed: May 14, 1996

Related U.S. Application Data

[63] Continuation of Ser. No. 211,276, Apr. 6, 1994, abandoned.

[30] Foreign Application Priority Data

Sep. 28, 1991 [DE] Germany .................. 41 32 430.7

[51] Int. Cl.$^6$ .................................................. B32B 27/40
[52] U.S. Cl. .................. 428/423.1; 427/388.2; 427/388.4; 427/393.5; 525/124; 524/507; 524/558
[58] Field of Search .................. 524/507, 558; 427/388.4, 388.2, 393.5; 525/124; 428/423.1

[56] References Cited

U.S. PATENT DOCUMENTS

| | | | |
|---|---|---|---|
| 4,981,921 | 1/1991 | Blum | 525/419 |
| 5,275,847 | 1/1994 | Schwarte | 525/301 |

FOREIGN PATENT DOCUMENTS 0365775  5/1990  European Pat. Off. .

*Primary Examiner*—Patricia A. Short
*Attorney, Agent, or Firm*—Anne Gerry Sabourin

[57] ABSTRACT

The invention relates to aqueous coatings comprising (A) a water-thinable polyacrylate resin and (B) a blocked polyisocyanate or a mixture of blocked polyisocyanates, wherein the water-thinable polyacrylate resin (A) has a hydroxyl number of 60 to 180, an acid number of 10 to 100, and a glass transition temperature (Tg) of −40° C. to +60° C.

15 Claims, No Drawings

AQUEOUS COATINGS AND PROCESSES FOR THE PRODUCTION OF AUTOMOBILE FINISHES

This application is a continuation of Ser. No. 08/211,276, filed on Apr. 6, 1994, now abandoned.

The invention relates to aqueous coatings, a process for the production of automobile finishes and the use of the aqueous coatings for the production of automobile finishes.

For ecological and economic reasons, the coatings industry is making efforts to replace as high a proportion as possible of the organic solvents employed in coatings by water.

In the case of automobile finishing in particular, there is a great demand for aqueous coatings. Automobile finishes are understood as meaning the coatings which are used to produce the uppermost coat. The uppermost coat can comprise one or more layers, in particular two layers.

Two-layer finishes consist of a pigmented base coat and a clear coat which is applied to the base coat and is unpigmented or pigmented only with transparent pigments. Two-layer finishes are currently produced by the "wet-on-wet" process, in which the object is precoated with a pigmented base coating and the base coat thus obtained is overcoated with a clear coating, without a baking step, and the base coat and clear coat are then baked together. This process is very advantageous from an economic point of view, but imposes high demands on the base coating and the clear coating. The clear coating applied to the base coating which has not yet been baked should not dissolve or otherwise interfere with the base coat, because otherwise finishes having a poor appearance are obtained. This particularly applies to finishes for which base coatings which comprise effect pigments (for example metallic pigments, in particular aluminum flakes or pearlescent pigments) are employed.

The object on which the present invention is based was to provide novel aqueous coatings which have improved properties and/or produce improved coating films compared with the comparable coatings of the prior art. Above all, the novel coatings should be suitable for the production of automobile finishes, and in particular have a reduced tendency to popping. Popping is understood as disturbances in the coating film due to gas bubbles.

Surprisingly, the object was achieved by providing aqueous coatings which comprise (A) a water-thinnable polyacrylate resin and
(B) a blocked polyisocyanate or a mixture of blocked polyisocyanates, the water-thinnable polyacrylate resin (A) being obtainable by (I) adding a component (a) consisting of
(a1) 40 to 86.75, preferably 40 to 80% by weight of a (meth)acrylic acid ester which differs from (a2), is copolymerizable with (a2), (a3), (b1) and (b2) and is essentially free from carboxyl groups, or a mixture of such (meth)acrylic acid esters, and
(a2) 12 to 50, preferably 16 to 45% by weight of an ethylenically unsaturated monomer which is copolymerizable with (a1), (a3), (b1) and (b2), carries at least one hydroxyl group per molecule and is essentially free from carboxyl groups, or a mixture of such monomers, and
(a3) 0 to 25, preferably 0 to 20% by weight of an ethylenically unsaturated monomer which is copolymerizable with (a1), (a2), (b1) and (b2), is essentially free from carboxyl groups and differs from (a1) and (a2), or a mixture of such monomers, and a component (b) consisting of (b1) 1.5 to 15, preferably 2 to 7% by weight of an ethylenically unsaturated monomer which carries at least one carboxyl group per molecule and is copolymerizable with (a1), (a2), (a3) and (b2), or a mixture of such monomers, and
(b2) 0 to 60, preferably 0 to 28% by weight of an ethylenically unsaturated monomer which is free from carboxyl groups and is copolymerizable with (a1), (a2), (a3) and (b1), or a mixture of such monomers, successively or in portions in alternation to an organic solvent or solvent mixture and polymerizing these components in the presence of at least one polymerization initiator, and (II) when the polymerization has ended, at least partly neutralizing the resulting polyacrylate resin and dispersing it in water, the sum of the amounts by weight of (a1), (a2), (a3), (b1) and (b2) always giving 100% by weight, and the nature and amount of (a1), (a2), (a3), (b1) and (b2) being chosen such that the polyacrylate resin has a hydroxyl number of 60 to 180, preferably 80 to 160, an acid number of 10 to 100, preferably 15 to 40, and a glass transition temperature ($T_G$) of −40° C. to +60° C., preferably −20° C. to +40° C.

Aqueous coatings which contain the water-thinnable polyacrylate resin (A) are known from DE-OS 38 32 826 and DE-OS 38 34 738. However, the coatings disclosed in DE-OS 38 32 826 and DE-OS 38 34 738 are in need of improvement in respect of their tendency to popping.

The components of the coatings according to the invention are described in more detail below.

The water-thinnable polyacrylate resin (A) is obtainable by (I) adding a component (a) consisting of
(a1) 40 to 86.75, preferably 40 to 80% by weight of a (meth)acrylic acid ester which differs from (a2), is copolymerizable with (a2), (a3), (b1) and (b2) and is essentially free from carboxyl groups, or a mixture of such (meth)acrylic acid esters, and
(a2) 12 to 50, preferably 16 to 45% by weight of an ethylenically unsaturated monomer which is copolymerizable with (a1), (a3), (b1) and (b2), carries at least one hydroxyl group per molecule and is essentially free from carboxyl groups, or a mixture of such monomers, and
(a3) 0 to 25, preferably 10 to 30% by weight of an ethylenically unsaturated monomer which is copolymerizable with (a1), (a2), (b1) and (b2), is essentially free from carboxyl groups and differs from (a1) and (a2), or a mixture of such monomers, and a component (b) consisting of
(b1) 1.25 to 15, preferably 2 to 7% by weight of an ethylenically unsaturated monomer which carries at least one carboxyl group per molecule and is copolymerizable with (a1), (a2), (a3) and (b2), or a mixture of such monomers, and
(b2) 0 to 60, preferably 0 to 28% by weight of an ethylenically unsaturated monomer which is free from carboxyl groups and is copolymerizable with (a1), (a2), (a3) and (b1), or a mixture of such monomers, successively or in portions in alternation to an organic solvent or solvent mixture and polymerizing these components in the presence of at least one polymerization initiator, and (II) when the polymerization has ended, at least partly neutralizing the resulting polyacrylate resin and dispersing it in water, the sum of the amounts by weight of (a1), (a2), (a3), (b1) and (b2) always giving 100% by weight, and the nature and amount of (a1), (a2), (a3), (b1) and (b2) being chosen such that the polyacrylate resin has a hydroxyl number of 60 to 180, preferably 80 to 160, an acid number of 10 to 100, preferably 15 to 40, and a glass transition temperature ($T_G$) of −40° C. to +60° C., preferably −20° C. to +40° C.

Before the preparation of the water-thinnable polyacrylate resins is described in more detail, two terminology explanations will first be given:

1.) "(meth)acrylic acid" is occasionally used as an abbreviation for "methacrylic acid or acrylic acid".
2.) The formulation "essentially free from carboxyl groups" is intended to express that components (a1), (a2) and (a3) can have a low carboxyl group content (but not more than an amount such that a polyacrylate resin prepared from components (b1), (b2) and (b3) has an acid number of not more than 10). However, it is preferable for the carboxyl content of components (a1), (a2) and (a3) to be kept as low as possible. Components (a1), (a2) and (a3) which are free from carboxyl groups are particularly preferably employed.

Any ester of (meth)acrylic acid which is copolymerizable with (a2), (a3), (b1) and (b2) and is essentially free from carboxyl groups, or a mixture of such (meth)acrylic acid esters, can be employed as component (a1). Examples which are mentioned are alkyl acrylates and alkyl methacrylates having up to 20 carbon atoms in the alkyl radical, such as, for example, methyl, ethyl, propyl, butyl, hexyl, ethylhexyl, stearyl and lauryl acrylate and methacrylate. Ethyltriglycol (meth)acrylate and methoxyoligoglycol (meth)acrylate having a number-average molecular weight of preferably 550 or other ethoxylated and/or propoxylated (meth)acrylic acid derivatives which are free from hydroxyl groups can also be employed as component (a1). It is also possible to employ (meth)acrylates containing functional groups —apart from hydroxyl groups—or mixtures of such (meth)acrylates as component (a1). Examples of (meth)acrylates of this type containing functional groups are: 2-tert.-butylaminoethyl (meth)acrylate, dihydrodicyclopentadienyl (meth)arcylate [sic], 1,3-butanediol di(meth)arcylate [sic], 1,6-hexanediol dimethacrylate, triethylene glycol di(meth)acrylate, glycidyl (meth)acrylate, allyl (meth)acrylate and benzene,1-(1-isocyanato-1-methylethyl)4-(1-methyl-ethenyl) [sic].

If (meth)acrylates containing functional groups are employed as component (a1), it must always be ensured that gelling does not occur. For this reason, the proportion of (meth)acrylates containing functional groups should not exceed 7% by weight, preferably 5% by weight, particularly preferably 2.5% by weight, based on the sum of the proportions by weight of (a1), (a2), (a3), (b1) and (b2). Mixtures of alkyl acrylates and/or alkyl methacrylates which contain at least 25% by weight of n-butyl or t-butyl acrylate and/or n-butyl or t-butyl methacrylate are preferably employed as the (a1) component.

All the ethylenically unsaturated monomers which can be copolymerized with (a1), (a3), (b1) and (b2), carry at least one hydroxyl group per molecule and are essentially free from carboxyl groups, or a mixture of such monomers, can be employed as component (a2). Examples which are mentioned are hydroxyalkyl esters of acrylic acid, methacrylic acid or another α,β-ethylenically unsaturated carboxylic acid. These esters can be derived from an alkylene glycol, which is esterified with the acid, or they can be obtained by reaction of the acid with an alkylene oxide. Hydroxyalkyl esters of acrylic acid and methacrylic acid in which the hydroxyalkyl group contains up to 6 carbon atoms, reaction products of cyclic esters, such as, for example, ε-caprolactone, and these hydroxyalkyl esters or mixtures of these hydroxyalkyl esters or ε-caprolactone-modified hydroxyalkyl esters are preferably employed as component (a2). Examples which are mentioned of such hydroxyalkyl esters are 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate, 4-hydroxybutyl methacrylate and hydroxyhexyl acrylate. Corresponding esters of other unsaturated acids, such as, for example, ethacrylic acid, crotonic acid and similar acids having up to about 6 carbon atoms per molecule, can also be employed.

All the ethylenically unsaturated monomers which are copolymerizable with (a1), (a2), (b1) and (b2), are essentially free from carboxyl groups and differ from (a1) and (a2), or mixtures of such monomers, can be employed as component (a3). Vinylaromatic hydrocarbons, such as styrene, α-alkylstyrene and vinyltoluene, are preferably employed as component (a3).

Any ethylenically unsaturated monomer which carries at least one carboxyl group per molecule and is copolymerizable with (b2), (a1), (a2) and (a3), or a mixture of such monomers, can be employed as component (b1) for the preparation of the polyacrylate resins to be employed according to the invention. Acrylic acid and/or methacrylic acid are preferably employed as component (b1). However, it is also possible to employ other ethylenically unsaturated acids. Examples of such acids which are mentioned are ethacrylic acid, crotonic acid, maleic acid, fumaric acid and itaconic acid. Succinic acid mono(meth)acryloyloxyethyl ester and phthalic acid mono(meth)acryloyloxyethyl ester, for example, can also be employed as component (b1).

Any ethylenically unsaturated monomer which is copolymerizable with (a1), (a2), (a3) and (b1) and is free from carboxyl groups, or a mixture of such monomers, can be employed as component (b2). All the monomers listed in the description of components (a1), (a2) and (a3) can be employed as component (b2).

The polyacrylate resins employed according to the invention can be prepared by adding component (a) to an organic solvent or solvent mixture, polymerizing the component there in the presence of at least one polymerization initiator and, when the addition of component (a) has ended, adding component (b) to the organic solvent or solvent mixture and polymerizing the component there in the presence of at least one polymerization initiator. The addition of component (b) should be started only when at least 60% by weight, preferably at least 80% by weight, of component (a) has reacted. It is particularly preferable to start the addition of component (b) only when component (a) has essentially reacted completely. When the polymerization has ended, the resulting polyacrylate resin is at least partly neutralized and dispersed in water. The sum of the amounts by weight of (a1), (a2), (a3), (b1) and (b2) is always 100% by weight. The nature and amount of components (a1), (a2), (a3), (b1) and (b2) are chosen so that the polyacrylate resin has a hydroxyl number of 60 to 180, preferably 80 to 160, an acid number of 10 to 100, preferably 15 to 40, and a glass transition temperature ($T_G$) of −40° C. to +60° C., preferably −20° C. to +40° C.

Component (a) is preferably added to the organic solvent or solvent mixture in the course of 2 to 8 hours, particularly preferably in the course of 3 to 6 hours, and is polymerized there in the presence of at least one initiator which forms free radicals. Component (b) is preferably added to the organic solvent or solvent mixture in the course of 10 to 90 minutes, particularly preferably in the course of 30 to 90 minutes, and polymerized there in the presence of at least one initiator which forms free radicals.

The polyacrylate resins to be employed according to the invention can also be prepared by adding components (a) and (b) in portions in alternation to an organic solvent or solvent mixture and polymerizing them there in the presence of at least one initiator which forms free radicals. The portions here should in each case consist at least 10% by weight of the total amount of component (a) or component (b) to be employed. Addition of a portion should be started only when at least 60% by weight, preferably at least 80% by weight, of the previous portion has reacted. It is particularly preferable to start with the addition of a portion only when the preceding portion has essentially reacted completely. When the polymerization has ended, the resulting polyacrylate resin is at least partly neutralized and dispersed in water. The sum of the amounts by weight of (a1), (a2), (a3), (b1) and (b2) is always 100% by weight. The nature and amount of components (a1), (a2), (a3), (b1) and (b2) are chosen such that the polyacrylate resin has a hydroxyl number of 60 to 180, preferably 80 to 160, an acid number of 10 to 100, preferably 15 to 40, and a glass transition temperature ($T_G$) of –40° C. to +60° C., preferably –20° C. to +40° C.

In a preferred embodiment of this preparation process, a portion of component (a) (portion 1) consisting of 30 to 70% by weight, preferably 40 to 60% by weight, particularly preferably 50 to 60% by weight of the total amount of component (a) to be employed is added to the organic solvent or solvent mixture in a first step and polymerized in the presence of at least one initiator which forms free radicals. When the addition of portion 1 has ended, a portion of component (b) (portion 2) consisting of 30 to 70% by weight, preferably 40 to 60% by weight, particularly preferably 50% by weight of the total amount of component (b) to be employed is added to the organic solvent or solvent mixture in a second step and polymerized in the presence of at least one initiator which forms free radicals. When the addition of portion 2 has ended, a portion of components (a) (portion 3) consisting of 30 to 70% by weight, preferably 40 to 60% by weight, particularly preferably 50% by weight of the total amount of component (a) to be employed is added to the organic solvent or solvent mixture in a third step and is polymerized in the presence of at least one initiator which forms free radicals. When the addition of portion 3 has ended, a portion of component (b) (portion 4) consisting of 30 to 70% by weight, preferably 40 to 60% by weight, particularly preferably 50% by weight, of the total amount of component (b) to be employed is added to the organic solvent or solvent mixture in a fourth step and is polymerized in the presence of at least one initiator which forms free radicals.

Addition of portions 2, 3 and 4 should be started only when at least 60% by weight, preferably at least 80% by weight, of the particular preceding portion has reacted. It is particularly preferable to start with the addition of a portion only when the preceding portion has reacted essentially completely.

When the polymerization has ended, the resulting polyacrylate resin is at least partly neutralized and dispersed in water. The sum of the amounts by weight of (a1), (a2), (a3), (b1) and (b2) is always 100% by weight. The nature and amount of components (a1), (a2), (a3), (b1) and (b2) are chosen such that the polyacrylate resin has a hydroxyl number of 60 to 180, preferably 80 to 160, an acid number of 10 to 100, preferably 15 to 40, and a glass transition temperature ($T_G$) of –40° C. to +60° C., preferably –20° C. to +40° C.

Portions 1 and 3 are preferably added in the course of 1 to 4 hours, particularly preferably in the course of 1½ to 3 hours. Portions 2 and 4 are preferably added in the course of 5 to 45 minutes, particularly preferably in the course of 15 to 45 minutes.

The polyacrylate resins employed according to the invention can also be prepared by polymerizing component (b) before component (a), or polymerizing portions of component (b) before portions of component (a), in a manner analogous to that described above.

Organic solvents and polymerization initiators which are employed are the solvents and polymerization initiators which are customary for the preparation of polyacrylate resins and are suitable for the preparation of aqueous dispersions. Examples which are mentioned of solvents which can be used are butylglycol, methoxypropanol, n-butanol, methoxybutanol, ethoxypropanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether, dipropylene glycol dimethyl esther [sic], dipropylene glycol monomethyl ether, propylene glycol-n-butyl ether, tripropylene glycol monomethyl ether and 3-methyl-3-methoxybutanol. Examples which are mentioned of polymerization initiators which can be used are initiators which form free radicals, such as, for example, benzoyl peroxide, t-butyl perethylhexanoate, azobisisobutyronitrile and t-butylperbenzoate. The polymerization is advantageously carried out at a temperature of 80° to 160° C., preferably 110° to 160° C. The polymerization has ended when all the monomers employed have reacted essentially completely.

The nature and amount of components (a1), (a2), (a3), (b1) and (b2) are chosen such that the reaction product has a hydroxyl number of 60 to 180, preferably 80 to 160, an acid number of 10 to 100, preferably 15 to 40, and a glass transition temperature ($T_G$) of –40° C. to +60° C., preferably –20° C. to +40° C.

The glass transition temperatures of polyacrylate resins can be calculated approximately from the following equation:

$$\frac{1}{T_G} = \sum_{n=1}^{n=x} \frac{W_n}{T_{Gn}}$$

$T_G$=glass transition temperature of the polyacrylate resin
x=number of different monomers copolymerized in the polyacrylate resin.
$W_n$=amount by weight of the nth monomer
$T_{Gn}$=glass transition temperature of the homopolymer of the nth monomer The amount and rate of addition of the initiator are preferably controlled such that the resulting polyacrylate resin has a number-average molecular weight of 2000 to 20,000 (determination by gel permeation chromatography using a polystyrene standard). It is particularly preferable to start the addition of the initiator at the same time as the addition of the polymerizable components (a) and (b), and to end it about half an hour after the addition of the polymerizable components (a) and (b) has been ended. The reaction mixture is then kept at the polymerization temperature until all the monomers employed have reacted essentially completely (as a rule about 1½ hours). "Reacted essentially completely" is intended to mean that preferably 100% by weight of the monomers employed has reacted, but that it is also possible that a small residual monomer content of not more than up to about 0.5% by weight, based on the weight of the reaction mixture, can remain unreacted.

When the polymerization has ended, the resulting polyacrylate resin is at least partly neutralized and dispersed in water. An aqueous polyacrylate resin dispersion is formed by this procedure. If appropriate, some or all of the organic solvent can be distilled off. The polyacrylate resin dispersions employed according to the invention comprise polyacrylate resin particles, the average particle size of which is preferably between 60 and 300 nm. (Measurement method: laser light scattering, measuring apparatus: Malvern Autosizer 2C).

Either organic bases or inorganic bases can be used to neutralize the polyacrylate resin. Primary, secondary and tertiary amines, such as, for example, ethylamine, propylamine, dimethylamine, dibutylamine, cyclohexylamine, benzylamine, morpholine, piperidine and triethanolamine, are preferably used. Tertiary amines, in particular dimethylethanolamine, triethylamine, tripropylamine and tributylamine, are particularly preferably employed as the neutralizing agent.

All the blocked polyisocyanates which can be dispersed in the aqueous dispersion of the polyacrylate resin (A), or mixtures of blocked polyisocyanates, can in principle be employed as component (B).

Blocked polyisocyanates, which in general can be prepared by reaction of a polyisocyanate with a blocking agent or a blocking agent mixture, are known crosslinking agents for coatings. In this procedure, the isocyanate groups of the polyisocyanate are blocked by reaction with the blocking agent, and are exposed again only during baking of the coating, after the blocking agent has been split off, and are then available for the crosslinking reaction with the groups which are reactive towards isocyanate groups and are contained in the other binder constituents, such as, for example, in the polyacrylate resin (A).

Polyisocyanates which can be employed for preparation of the blocked polyisocyanates are in principle all the polyisocyanates suitable for coatings. Examples which are mentioned are: polyisocyanates having 4 to 25, preferably 4 to 16 C atoms and 2 to 4, preferably 2 isocyanate groups per molecule, that is to say aliphatic, cycloaliphatic, araliphatic and aromatic diisocyanates, such as are described, for example, in "Methoden der Organischen Chemie" (Methods of Organic Chemistry) (Houben-Weyl), Volume 14/2, 4th edition, Georg Thieme Verlag, Stuttgart 1963, pages 61–70, and by W. Siefken, Liebigs Ann. Chem. 562, 75–136, for example ethylene 1,2-diiscyanate (sic), tetramethylene 1,4-diisocyanate, hexamethylene 1,6-diisocyanate, 2,2,4- and 2,4,4-tri-methyl-hexamethylene 1,6-diisocyanate, dodecane 1,12-diisocyanate, ω,ω-diisocyanatodipropyl ether, cyclobutane 1,3-diisocyanate, cyclohexane 1,3- and 1,4-diisocyanate, 2,2- and 2,6-diisocyanato-1-methylcyclohexane, 3-isocyanatomethyl-3,5,5-trimethylcyclohexyl isocyanate (isophorone diisocyanate), 2,5- and 3,5-bis-(isocyanatomethyl)-8-methyl-1,4-methanodecahydronapthalene [sic], 1,5-, 2,5-, 1,6- and 2,6-bis(isocyanatomethyl)-4,7-methano-hexahydroindane, 1,5-, 2,5-, 1,6- and 2,6-bis(isocyanato)-4,7-methano hexahydroindane, dicyclohexyl 2,4'- and 4,4'-diisocyanate, hexahydrotoluylene 2,4- and 2,6-diisocyanate, perhydrodiphenylmethane 2,4'- and 4,4'-diisocyanate, ω,ω-diisocyanato-1,4-diethylbenzene, phenylene 1,3- and 1,4-diisocyanate, 4,4'-diisocyanato-diphenyl, 4,4'-diisocyanato-3,3'-dichlorodiphenyl, 4,4'-diisocyanato-3,3'-dimethoxydiphenyl, 4,4'-diisocyanato-3,3'-dimethyl-diphenyl, 4,4'-diisocyanato-3,3'-diphenyl-diphenyl, 2,4'- and 4,4'-diisocyanato-diphenylmethane, naphthylene 1,5-diisocyanate, toluylene diisocyanates, such as toluylene 2,4- and 2,6-diisocyanate, N,N'-(4,4'-dimethyl-3,3'-diisocyanato-diphenyl)-uretdione, m-xylylene diisocyanate, dicyclohexylmethane diisocyanate and tetramethylxylylene diisocyanate, and also triisocyanates, such as 2,4,4'-triisocyanatodiphenyl ether and 4,4',4"-triisocyanatotriphenylmethane. It is also possible to employ polyisocyanates containing carbodiimide groups and/or isocyanurate groups and/or biuret groups and/or urethane groups and/or urea groups and/or carboxyl groups. Polyisocyanates containing urethane groups are obtained, for example, by reaction of some of the isocyanate groups with polyols, such as, for example, trimethylolpropane, glycerol, polyester-polyols and polyether-polyols. Carboxyl group-containing polyisocyanates can be obtained, for example, by reacting some of the isocyanate groups with carboxyl group-containing compounds, such as, for example, dimethylolpropionic acid or other hydroxycarboxylic acids or carboxyl group-containing and hydroxyl group-containing polyesters. Aliphatic or cycloaliphatic polyisocyanates, in particular hexamethylene diisocyanate, dimerized hexamethylene diisocyanate, trimerized hexamethylene diisocyanate, isophorone diisocyanate, dicyclohexylmethane 2,4'-diisocyanate and dicyclohexylmethane 4,4'-diisocyanate, or mixtures of these polyisocyanates, are preferably employed for the preparation of automobile top coatings. Trimerized hexamethylene diisocyanate is especially preferably employed. Trimerized hexamethylene diisocyanate is a commercial product which is sold, for example, under the trade names Tolunate® EDT (Rhône-Poulenc), Desmodur® N33 (Bayer AG) and Basonat® PLR 8638 (BASF AG).

The polyisocyanates in question can in principle be blocked with any blocking agents or mixtures of blocking agents suitable for blocking polyisocyanates. Suitable blocking agents in general contain an amine, amide, lactam, thiol or hydroxyl group or a C-H acid grouping. Examples which are mentioned are: aliphatic, cycloaliphatic or araliphatic monoalcohols, such as methyl, ethyl, propyl, butyl, amyl, hexyl, heptyl, octyl, nonyl, 3,3,5-trimethylhexyl, decyl, 2-ethylhexyl and lauryl alcohol, ethylglycol monoethyl ether, ethylglycol monobutyl ether, cyclopentanol, cyclohexanol, phenylcarbinol and methylphenylcarbinol, oximes, such as methyl amyl ketoxime, diisobutyl ketoxime, methyl ethyl ketoxime, methyl isobutyl ketoxime, acetone oxime and cyclohexanone oxime, dialkylamino-alcohols, such as dimethylethanolamine and diethylethanolamine, phenols, such as cresol, phenol, t-butylphenol and ethylphenol, lactams, such as ε-caprolactam, imides, such as phthalimide, and malonic acid esters or acetoacetic esters.

The expert can select suitable blocking agents from the known blocking agents which are suitable for blocking polyisocyanates, taking into account the fact that the blocked polyisocyanates should not undergo any chemical reaction with other coating constituents before the start of the baking process, but should have reacted with the isocyanate-reactive binders as completely as possible when the baking process has ended.

Blocking agents which are preferably employed are methyl ethyl ketoxime, methyl amyl ketoxime, diisobutyl ketoxime and diethyl malonate. Methyl ethyl ketoxime and diethyl malonate are blocking agents which are particularly preferably employed.

Mixtures of different blocking agents can also be employed.

In some cases, it may be advantageous to add to the coating a catalyst for the reaction of the isocyanate groups of the blocked isocyanate with the isocyanate-reactive groups, in particular hydroxyl groups of the other binder constituents. Examples of suitable catalysts are tin compounds, such as dibutyltin dilaurate and tin acetate.

The content of blocked polyisocyanate is in general high enough for the ratio between the OH equivalents and NCO equivalents to be between 1.0:0.7 and 1.0:1.2, preferably between 1.0:0.8 and 1.0:1.0.

In some cases, it is advantageous also to employ an amino resin or a mixture of amino resins as a further crosslinking agent (component (C)), in addition to component (B). Such amino resins are well-known and are available as commercial products from many companies (for example Cymel® from American Cyanamid Company, Resimene® from Monsanto Company and Luwipal® from BASF AG). These are as a rule at least partly etherified condensation products of compounds containing amino groups, in particular melamine or benzoguanamine, and aldehydes, in particular formaldehyde. The water-thinnability of the amino resins in general depends on the degree of condensation and on the etherification component. The lower the degree of condensation and the shorter the chain length of the alkyl groups in the etherification component, the better the water-thinnability of the amino resins. The water-thinnability of amino resins can also be improved by introducing carboxyl groups (for example etherification with hydroxycarboxylic acids). The water-thinnability of amino resins can also be improved by addition of water-thinnable solvents, such as, for example, glycol ethers.

If a combination of blocked polyisocyanates and amino resins is employed in the coatings according to the invention, the weight ratio of blocked polyisocyanate employed to amino resin employed is between 20:80 and 80:20, preferably between 67:33 and 33:67. The ratio between the weight of the mixture of blocked polyisocyanate and amino resin to the weight of the other binder constituents is in general 50:50 to 10:90, preferably 40:60 to 20:80.

Blocked polyisocyanates which are stable in aqueous media for only a limited time can also be employed as component (B). In this case, it is advantageous to employ the coatings according to the invention as two-component systems, that is to say to mix the polyisocyanate component with the aqueous coating component only shortly before or during application.

In addition to the binders described above, the coatings according to the invention can also comprise other water-thinnable synthetic resins, which can be used, where appropriate, for grinding the pigments and/or as rheology-controlling additives. Examples of such synthetic resins which are mentioned are: water-thinnable polyurethane resins, water-thinnable polyester resins, polyethers, such as, for example, polypropylene glycol having a number-average molecular weight of 400 to 900, water-soluble cellulose ethers, such as hydroxyethylcellulose, methylcellulose or carboxymethylcellulose, and synthetic polymers having ionic and/or associating groups, such as polyvinyl alcohol, poly(meth)acrylamide, poly(meth)acrylic acid, polyvinylpyrrolidone, styrene/maleic anhydride or ethylene/maleic anhydride copolymers and their derivatives, or hydrophobically modified ethoxylated urethanes, or polyacrylates containing carboxyl groups.

The coatings according to the invention can also comprise crosslinked polymicroparticles, such as are disclosed, for example, in EP-A-38 127.

The coatings according to the invention can also comprise inorganic rheology-controlling agents, such as, for example, laminar silicates.

The aqueous coatings according to the invention can also comprise the customary organic solvents. The content thereof is kept as low as possible. It is, for example, less than 15% by weight, based on the total content of volatile constituents.

The coatings according to the invention are in general brought to a pH of between 6.5 and 9.0. The pH can be adjusted using customary amines, such as, for example, triethylamine, dimethylaminoethanol and N-methylmorpholine.

The coatings according to the invention can be applied to any desired substrates, such as, for example, metal, wood, plastic or paper, by customary application methods, such as, for example, spraying, knife-coating, brushing or dipping.

The coatings according to the invention are preferably employed for the production of automobile finishes. The coatings according to the invention can be employed both in original finishing and in refinishing of automobile bodies. They are preferably employed in original finishing of automobile bodies.

Automobile finishes are produced in a process in which, on automobile bodies coated with at least one electrodeposition coat and at least one filler layer applied on top, either a pigmented top coating is applied and baked (single-layer finish) or a pigmented base coating and, on top of this, a clear coating which is unpigmented or pigmented only with transparent pigments are applied, and the base coat is then baked together with the clear coat (two-layer finish).

The coatings according to the invention can be employed for the production of single-layer finishes, as pigmented base coatings or as clear coatings. The coatings according to the invention are preferably employed as clear coatings.

If the coatings according to the invention are employed for the production of single-layer finishes or as base coatings, they can be pigmented with pigments, such as, for example, pigments on an inorganic basis, such as, for example, titanium dioxide, iron oxide, carbon black and the like, and/or pigments on an organic basis and/or metallic pigments, such as, for example, aluminum bronzes and/or pearlescent or interference pigments. Aluminum bronzes and pearlescent or interference pigments are examples of effect pigments.

If the coatings according to the invention are employed as pigmented base coatings, they can be overcoated with coatings according to the invention which contain no pigments or are pigmented only with transparent pigments, but they can also be overcoated with conventional clear coatings based on organic solvents, with aqueous clear coatings or with clear powder coatings.

The coatings according to the invention in particular have the advantage that they have a reduced tendency to popping.

The invention is illustrated in more detail in the following examples.

All the data on parts and percentages are weight data, unless expressly stated otherwise.

1. Preparation of a Water-Thinnable Polyacrylate Resin (A) According to Example A. of DE-OS38 32 826

20 parts by weight of butylglycol are initially introduced into a 4 l steel kettle equipped with two monomer feeds, one initiator feed, a stirrer, a thermometer, oil heating and a reflux condenser, and are heated up to 140° C. A solution of 4.5 parts by weight of butyl perbenzoate in 5 parts by weight of butylglycol is then added at a rate such that the addition has ended after 4 hours and 30 minutes. When the addition of the butyl perbenzoate solution is started, addition of a mixture of 22.0 parts by weight of butyl acrylate, 20.0 parts by weight of butyl methacrylate, 15.0 parts by weight of methyl methacrylate, 23.0 parts by weight of 2-hydroxypropyl acrylate and 15.0 parts by weight of styrene is also started. The mixture is added at a rate such that the addition has ended after 3 hours and 50 minutes. When all of the mixture has been added, 5.0 parts by weight of acrylic acid are added in the course of 20 minutes. The resin solution thus obtained is neutralized to a degree of neutralization of 80% with dimethylethanolamine at about 95° C. Water is then added in an amount such that the solids content of the dispersion is about 60% by weight. The resulting dispersion has the following parameters: solids content: 59.6% by weight (1 hour, 130° C.), acid number: 39.4, particle size: 143 nm (determined by laser light scattering; apparatus: Malvern Autosizer 2C).

2. Preparation of An Aqueous Clear Coating in Accordance With the Teaching of DE-OS 38 32 826 (Clear Coating I: Comparison Example)

9.8 parts by weight of a mixture of 9.4 parts by weight of a 90 percent strength by weight solution of a commercially available water-thinnable melamine/formaldehyde resin in isobutanol (Cymel® 327) and 0.4 part by weight of a 10 percent strength by weight solution of a commercially available flow control agent (Silwet® 7602) in butylglycol are added to 53.1 parts by weight of the dispersion prepared in accordance with point 1., while stirring. When the addition has ended, the mixture is stirred for a further 5 minutes, and 37.1 parts by weight of deionized water are slowly added, while stirring. A pH of 7.8 and a spray viscosity of a 23 s flow-out time from a DIN 4 cup (DIN 53 211 (1974)) are then established with a 10 percent strength by weight aqueous dimethylethanolamine solution and deionized water. The resulting clear coating is finally filtered through a plate filter fitted with Leitz T 1000 filter layer. Application solids content: 36.0% by weight (1 hour, 160° C.).

3. Preparation of the Nlocked Polyisocyanate (B)

33.33 parts by weight of methyl ethyl ketone and 68.49 parts by weight of a commercially available, trimerized hexamethylene diisocyanate are initially introduced into a steel kettle equipped with a feed vessel, a stirrer, a thermometer, oil heating and a reflux condenser, and are heated up to 60° C. 31.51 parts by weight of methyl ethyl ketoxime are then added in the course of 2 hours. The temperature is kept at 60° C. until the NCO content is ≦0.25% by weight. The residual NCO groups are then reacted with a two-fold molar excess of ethanol. 30 minutes after the addition of the corresponding amount of ethanol, 25 parts by weight of butylglycol are added at 70° C., and the methyl ethyl ketone is distilled off. The reaction product is adjusted to a solids content of 75.1% by weight (1 hour, 150° C.) with butylglycol. A viscosity of 6.1 dPa s (plate/ball viscometer at 23° C.) is measured.

4. Preparation of a Clear Coating According To the Invention (Clear Coating II)

The procedure followed is as described under point 2. However, instead of the mixture of melamine/formaldehyde resin solution and flow control agent solution, 22.0 parts by weight of a mixture of 21.6 parts by weight of the polyisocyanate solution obtained according to point 3 and 0.4 part by weight of the flow control agent solution described under point 2 are employed. Application solids content: 37.1% by weight (1 hour, 160° C.).

5. Application of the Clear Coatings and Testing of the Resulting Ffinishes

A commercially available water-based coating pigmented with aluminum platelets is applied to phosphated steel sheets, which have been coated with a commercially available electro-deposition finish and a commercially available filler, such that a dry film thickness of 12 to 15 µm is obtained. The base coating film is dried at room temperature for 10 minutes and at 80° C. for 10 minutes. The steel sheets coated in this way are sprayed with clear coatings I and II using a conveyor cup gun in 3 applications in total with an intermediate flash-off time of 1 minute, and the coatings are dried at room temperature for 20 minutes and baked in a circulating air oven at 160° C. for 20 minutes. The clear coatings are sprayed such that clear coating films having a dry film thickness which rises from 20 µm continuously to 70 µm (wedge-shaped course of the layer thickness) are obtained. The finishes thus obtained are tested. The test results are summarized in the following table.

| Finish with clear coating | I | II |
|---|---|---|
| Popping limit[1] | 43 µm | 63 µm |
| Gloss[2] | 90 | 90 |
| DOI | 80 | 86 |
| Cross-hatch[3] | 0 | 0 |

[1] Popping limit is understood as the dry film thickness up to which no disturbances in the coating film due to gas bubbles can be observed. If the coating is applied with a dry film thickness above the popping limit, disturbances in the coating film due to gas bubbles occur.

[2] Degree of gloss according to DIN 67 530, angle 20°.

[3] Testing in accordance with DIN 53 151, including the Tesa peel-off test

The experiments described above show that the use according to the invention of a blocked polyisocyanate instead of a melamine/formaldehyde resin results both in a reduced tendency to popping and in an improvement of the DOI value.

We claim:

1. A method of improving the popping limit of an aqueous coating comprising a water-thinnable, hydroxyl-containing polyacrylate resin wherein the popping limit is improved by adding a blocked polyisocyanate or a mixture of blocked polyisocyanates to the coating in an amount so that the ratio between the OH equivalents and NCO equivalents is between 1.0:0.7 and 1.0:1.2;

wherein the water-thinnable polyacrylate resin is obtained by (I) adding a component (a) comprising
  (a1) 40 to 86.75% by weight of a (meth)acrylic acid ester which differs from (a2), is copolymerizable with (a2), (a3), (b1) and (b2) and is essentially free from carboxyl groups, or a mixture of such (meth)acrylic acid esters, and
  (a2) 12 to 50% by weight of an ethylenically unsaturated monomer which is copolymerizable with (a1), (a3), (b1) and (b2), carries at least one hydroxyl group per molecule and is essentially free from carboxyl groups, or a mixture of such monomers, and (a3) 0 to 25% by weight of an ethylenically unsaturated monomer which is copolymerizable with (a1), (a2), (b1) and (b2), is essentially free from carboxyl groups and differs from (a1) and (a2), or a mixture of such monomers, and a component (b) comprising (b1) 1.25 to 15% by weight of an ethylenically unsaturated monomer which carries at least one carboxyl group per molecule and is copolymerizable with (a1), (a2), (a3) and (b2), or a mixture of such monomers, and (b2) 0 to 60% by weight of an ethylenically unsaturated monomer which is free from carboxyl groups and is copolymerizable with (a1), (a2), (a3), and (b1), or a mixture of such monomers, successively or in portions in alternation to an organic solvent or solvent mixture and polymerizing these components in the presence of at least one polymerization initiator, and (II) when the polymerization has ended, at least partly neutralizing the resulting polyacrylate resin and dispersing it in water, the sum of the amounts by weight of (a1), (a2), (a3), (b1), and (b2) always giving 100% by weight, and the nature and amount of (a1), (a2), (a3), (b1), and (b2) being chosen such that the polyacrylate resin has a hydroxyl number of 60 to 180, an acid number of 10 to 100, and a glass transition temperature ($T_G$) of −40° C. to +60° C.

2. A method as claimed in claim 1, wherein the aqueous coating further comprises an amino resin or a mixture of amino resins.

3. A method as claimed in claim 2, wherein the water-thinnable polyacrylate resin (A) is obtained by employing 40 to 80% by weight of (a1), 16 to 45% by weight of (a2), 0 to 20% by weight of (a3), 2 to 7% by weight of (b1), and 0 to 28% by weight of (b2), and choosing the nature and amount of (a1), (a2), (a3), (b1) and (b2) such that the polyacrylate resin has a hydroxyl number of 80 to 160, an acid number of 15 to 40 and a glass transition temperature ($T_G$) of −20° C. to +40° C.

4. A method as claimed in claim 1, wherein the water-thinnable polyacrylate resin (A) is obtained by employing 40 to 80% by weight of (a1), 16 to 45% by weight of (a2), 0 to 20% by weight of (a3), 2 to 7% by weight of (b1), and 0 to 28% by weight of (b2), and choosing the nature and amount of (a1), (a2), (a3), (b1) and (b2) such that the polyacrylate resin has a hydroxyl number of 80 to 160, an acid number of 15 to 40 and a glass transition temperature ($T_G$) of −20° C. to +40° C.

5. An automobile finish produced according to the method of claim 1.

6. A process for the production of automobile finishes demonstrating reduced popping, which comprises applying an aqueous coating to a layer of a pigmented coating selected from the group consisting of base coatings and filler coatings and baking the aqueous coating together with the base coat or filler coat, wherein the aqueous coating is a water-thinnable polyacrylate resin obtained by (I) adding a component (a) comprising (a1) 40 to 86.75% by weight of a (meth)acrylic acid ester which differs from (a2), is copolymerizable with (a2), (a3), (b1) and (b2) and is essentially free from carboxyl groups, or a mixture of such (meth)acrylic acid esters, and (a2) 12 to 50% by weight of an ethylenically unsaturated monomer which is copolymerizable with (a1), (a3), (b1) and (b2), carries at least one hydroxyl group per molecule and is essentially free from carboxyl groups, or a mixture of such monomers, and (a3) 0 to 25% by weight of an ethylenically unsaturated monomer which is copolymerizable with (a1), (a2), (b1) and (b2), is essentially free from carboxyl groups and differs from (a1) and (a2), or a mixture of such monomers, and a component (b) comprising (b1) 1.25 to 15% by weight of an ethylenically unsaturated monomer which carries at least one carboxyl group per molecule and is copolymerizable with (a1), (a2), (a3) and (b2), or a mixture of such monomers, and (b2) 0 to 60% by weight of an ethylenically unsaturated monomer which is free from carboxyl groups and is copolymerizable with (a1), (a2), (a3), and (b1), or a mixture of such monomers, successively or in portions in alternation to an organic solvent or solvent mixture and polymerizing these components in the presence of at least one polymerization initiator, and (II) when the polymerization has ended, at least partly neutralizing the resulting polyacrylate resin and dispersing it in water, the sum of the amounts by weight of (a1), (a2), (a3), (b1), and (b2) always giving 100% by weight, and the nature and amount of (a1), (a2), (a3), (b1), and (b2) being chosen such that the polyacrylate resin has a hydroxyl number of 60 to 180, an acid number of 10 to 100, and a glass transition temperature ($T_G$) of −40° C. to +60° C., wherein the popping limit is improved by adding a blocked polyisocyanate or a mixture of blocked polyisocyanates to the coating in an amount so that the ratio between the OH equivalents and NCO equivalents is between 1.0:0.7 and 1.0:1.2.

7. A process for the production of automobile finishes, according to claim 6, wherein the aqueous coating further comprises an amino resin or a mixture of amino resins.

8. A process for the production of automobile finishes as claimed in claim 7, wherein an aqueous coating is applied to a layer of a base or filler coating pigmented with effect pigments or a mixture of effect pigments.

9. A process for the production of automobile finishes according to claim 6, wherein the polyacrylate resin (A) is obtained by employing 40 to 80% by weight of (a1), 16 to 45% by weight of (a2), 0 to 20% by weight of (a3), 2 to 7% by weight of (b1), and 0 to 28% by weight of (b2), and choosing the nature and amount of (a1), (a2), (a3), (b1) and (b2) such that the polyacrylate resin has a hydroxyl number of 80 to 160, an acid number of 15 to 40 and a glass transition temperature ($T_G$) of −20° C. to +40° C.

10. A process for the production of automobile finishes as claimed in claim 9, wherein an aqueous coating is applied to a layer of a base or filler coating pigmented with effect pigments or a mixture of effect pigments.

11. A process for the production of automobile finishes according to claim 6, wherein the polyacrylate resin (A) is obtained by employing 40 to 80% by weight of (a1), 16 to 45% by weight of (a2), 0 to 20% by weight of (a3), 2 to 7% by weight of (b1), and 0 to 28% by weight of (b2), and choosing the nature and amount of (a1), (a2), (a3), (b1) and (b2) such that the polyacrylate resin has a hydroxyl number of 80 to 160, an acid number of 15 to 40 and a glass transition temperature ($T_G$) of −20° C. to +40° C.

12. A process for the production of automobile finishes as claimed in claim 11, wherein an aqueous coating is applied to a layer of a base or filler coating pigmented with effect pigments or a mixture of effect pigments.

13. A process for the production of automobile finishes as claimed in claim 6, wherein an aqueous coating is applied to a layer of a base or filler coating pigmented with effect pigments or a mixture of effect pigments.

14. An automobile finish produced according to the method of claim 13.

15. An automobile finish produced according to the method of claim 6.

* * * * *